(No Model.)
W. J. LLOYD & W. PRIEST.
TRICYCLE.
No. 353,793. Patented Dec. 7, 1886.
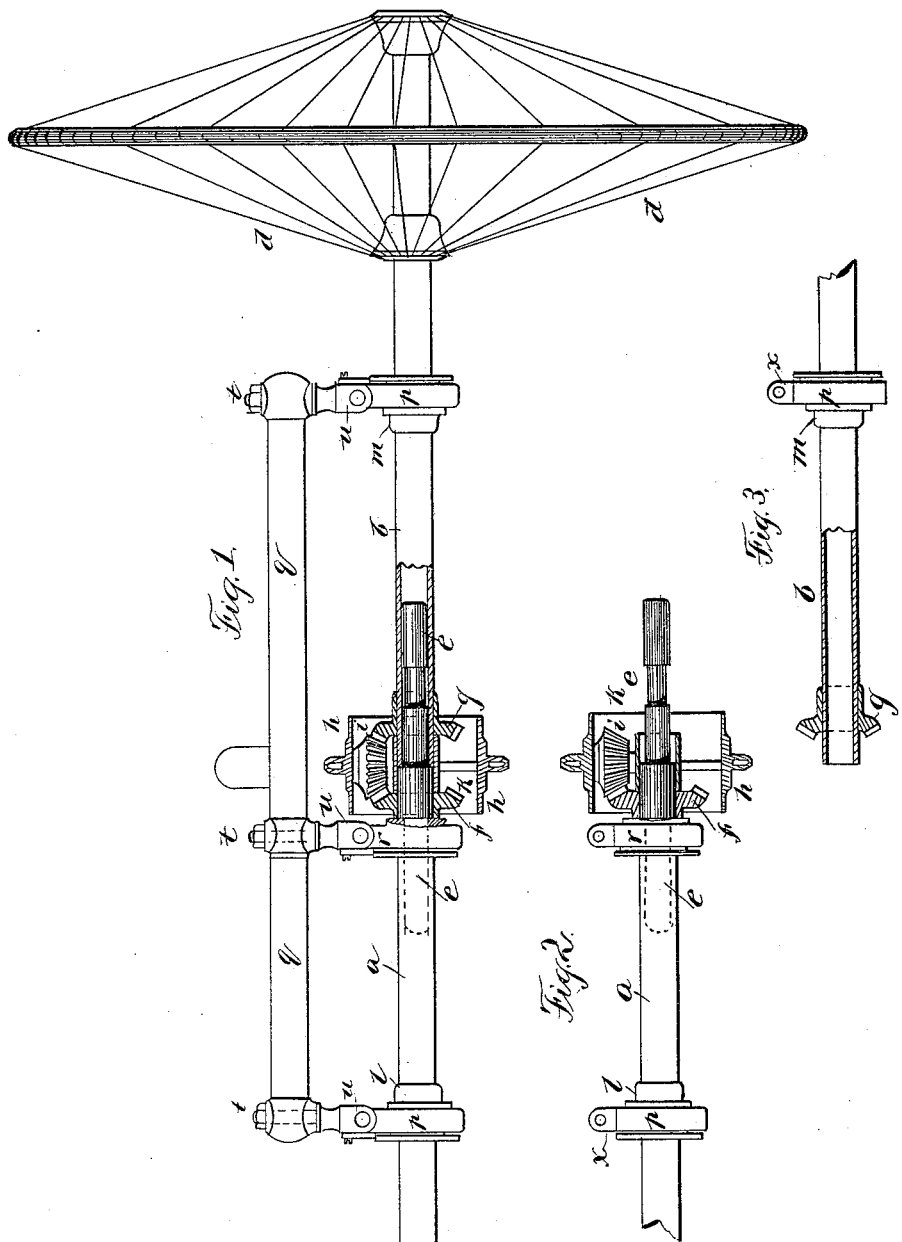
Witnesses:
C. W. H. Brown
M. L. Williams
Inventors:
Walter John Lloyd
William Priest
By Wallace A. Bartlett
Attorney

UNITED STATES PATENT OFFICE.

WALTER JOHN LLOYD AND WILLIAM PRIEST, OF HARBORNE, COUNTY OF STAFFORD, ENGLAND.

TRICYCLE.

SPECIFICATION forming part of Letters Patent No. 353,793, dated December 7, 1886.

Application filed May 22, 1886. Serial No. 202,983. (No model.) Patented in England August 5, 1884, No. 10,954.

*To all whom it may concern:*

Be it known that we, WALTER JOHN LLOYD and WILLIAM PRIEST, both residing at Harborne, in the county of Stafford, England, have invented certain new and useful Improvements in Tricycles, of which the following is a specification, reference being had therein to the accompanying drawings.

This invention is patented in England, No. 10,954, dated August 5, 1884; complete specification dated March 27, 1885.

This invention consists of the improvements hereinafter described in the application or adaptation of balance-gearing to the middle of the shaft or principal axis of central-gear tricycles and other velocipedes.

According to this invention the said shaft or axis is made tubular and divided at the middle of its length. In the inner end of one part of the divided shaft is fixed, by brazing or otherwise, a solid cylindrical plug of about six inches in length. About one-third of the length of the said plug is fixed in the part of the shaft last referred to, the remaining two-thirds protruding from the said part of the shaft. On this protruding end of the plug the inner end of the other part of the shaft fits and turns freely. Two toothed wheels are fixed, respectively, near the inner ends of the divided shaft. The boss or bush of the chain-wheel works upon the two ends of the divided shaft, covering and protecting their junction. The axis of the third beveled toothed wheel of the balance-gearing works between the gears with the two beveled toothed wheels before mentioned, and is carried by the chain-wheel. The outer ends of the two parts of the shaft pass through and work in bearings carried by the framing of the machine, and collars brazed on each of these parts respectively abut against the said bearings and prevent the two parts of the shaft from separating. By these improvements the tendency in the tricycle or velocipede to a deflection from a rectilinear path, which occurs in tricycles and velocipedes in which balance-gear is applied in the ordinary way, is avoided. Additional strength is given to the shaft or principal axis. When the parts of the balance-gear and shaft are constructed and arranged according to this invention they are not liable to get out of order.

Figure 1 of the accompanying drawings represents, partly in end elevation and partly in longitudinal section, a portion of a central-gear tricycle, the shaft or axis carrying the central driving or balance gear being constructed according to our invention. Figs. 2 and 3 represent the two parts of the shaft disconnected.

The same letters of reference indicate the same parts in the several figures of the drawings.

$a\ b$ are the two parts of the divided shaft or axis of the tricycle, the part $a$ having fixed on its outer end the traveling wheel $c$, and the part $b$ having fixed on its outer end the traveling wheel $d$. Both parts, $a\ b$, of the shaft or axis are tubular, and in the inner end of the part $a$ a solid cylindrical plug, $e$, is fixed, one-third of the said plug being fixed in the part $a$ and the remaining two-thirds protruding from the said part $a$ of the shaft, as represented. We prefer to fix the plug $e$ in its place in the part $a$ by heating the end of the said shaft and driving the end of the plug into the slightly-expanded heated end of the shaft; but other ways of fixing the plug in the shaft may be used. On the protruding end of the plug $e$ the inner end of the part $b$ of the shaft fits and turns freely.

Near the inner end of the part $a$ of the divided shaft a beveled wheel, $f$, is fixed, and near the inner end of the other part, $b$, of the shaft a similar beveled wheel, $g$, is fixed.

$h$ is the chain wheel, carrying in its interior the usual beveled pinion, $i$, for gearing with the two beveled wheels on the sections or parts $a\ b$, and thereby connecting the two shafts together, as is well understood.

$k$ is the boss or bush of the chain-wheel $h$, working upon the two ends of the divided shaft and covering and protecting their junction. (See Fig. 1, where it will be seen that one-half of the bush $k$ is situated on an enlarged part of the plug $e$, fixed to the half-shaft $a$, and the extreme end of the half-shaft $b$ enters the annular space between the plug $e$ and the other half of the bush $k$.)

$l$ is a collar brazed near the outer end of the half-shaft $a$, and $m$ is a similar collar brazed near the outer end of the half-shaft $b$.

$p\ p$ are the outer bearings for the shaft, carried by the frame $q$ of the tricycle. In these bearings $p\ p$ the two parts $a\ b$ of the shaft work, the collars $l\ m$ abutting against the inner sides of the bearings $p\ p$ and preventing the two parts of the shaft from separating, as will be understood from an examination of Fig. 1. A third bearing, $r$, for the shaft is used near the chain-wheel $h$.

We prefer to connect the bearings $p\ p\ r$ to the frame $q$ of the tricycle by means of screw-pins $t\ t$, passed through enlargements in the frame $q$ and fixed by screw-nuts, the bottoms of the screw-pins $t\ t$ being formed into forks $u$, between which the snugs $x\ x$ on the tops of the bearings engage and are fixed by cross-pins.

The action of the balance-gear applied or adapted to the shaft according to this invention differs in no essential respect from that of balance-gear of the same kind applied or adapted in the ordinary way, and we therefore do not think it necessary to describe the same.

We claim—

1. In a tricycle, the tubular axle divided in the middle, each axle-section having a bevel-wheel secured thereto near the inner end, a solid plug entering and secured to one section and entering the other section so as to revolve therein, and the chain-wheel having its boss covering the junction of the two shafts and bearing a bevel-wheel engaging the aforementioned bevel-wheels, all in combination substantially as stated.

2. In a tricycle, the tubular axle divided in the middle and having a bevel secured near the inner end of each section, the solid plug secured to one section and entering the other section, the chain-wheel having its hub covering the ends of both axle-sections and bearing the intermediate bevel-wheel, and the framing having a bearing near the axle-joint, and other bearings near the outer ends of the axle, all in combination substantially as described.

In testimony whereof we affix our signatures in presence of two witnesses.

WALTER JOHN LLOYD.
WILLIAM PRIEST.

Witnesses:
H. G. PRIEST,
ARTHUR RICHARD ALBERT.